(12) United States Patent
Lee et al.

(10) Patent No.: US 10,942,391 B2
(45) Date of Patent: Mar. 9, 2021

(54) DISPLAY APPARATUS

(71) Applicant: SAMSUNG ELECTRONICS CO., LTD., Suwon-si (KR)

(72) Inventors: Hyung Jin Lee, Suwon-si (KR); Wook Jae Jeon, Suwon-si (KR); Young Chol Lee, Suwon-si (KR); Ju Hyun Lee, Suwon-si (KR); Tae Young Lee, Suwon-si (KR); Seung Hun Chae, Suwon-si (KR); Jun Sung Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/659,896

(22) Filed: Oct. 22, 2019

(65) Prior Publication Data
US 2020/0133062 A1 Apr. 30, 2020

(30) Foreign Application Priority Data

Oct. 24, 2018 (KR) ........................ 10-2018-0127427

(51) Int. Cl.
*G02F 1/1335* (2006.01)
(52) U.S. Cl.
CPC .... *G02F 1/133528* (2013.01); *G02F 2201/08* (2013.01); *G02F 2202/28* (2013.01)
(58) Field of Classification Search
CPC ............ G02F 1/1333; G02F 1/133528; G02F 1/1335; G02F 2201/08; G02F 2202/28; G09G 3/18; G02B 5/003; G02B 5/0257

(Continued)

(56) References Cited

U.S. PATENT DOCUMENTS

2006/0007302 A1* 1/2006 Numata ............ G02F 1/133524
348/71
2008/0130112 A1 6/2008 Hsu et al.
(Continued)

FOREIGN PATENT DOCUMENTS

EP   3 474 067      4/2019
JP   2010-198037    9/2010
(Continued)

OTHER PUBLICATIONS

Search Report dated Jan. 20, 2020 in counterpart International Patent Application No. PCT/KR2019/012006.
(Continued)

*Primary Examiner* — Charles S Chang
(74) *Attorney, Agent, or Firm* — Nixon & Vanderhye P.C.

(57) ABSTRACT

There is provided a display apparatus with an improved viewing angle. The display apparatus includes a display panel configured to receive light from a light source module, wherein the display panel includes: a liquid crystal panel; a first polarizing plate positioned on a rear side of the liquid crystal panel and a second polarizing plate positioned on a front side of the liquid crystal panel; and an optical layer positioned on a front surface of the second polarizing plate, wherein the optical layer includes: a resin layer having a first refractive index, and including an accommodating groove in which a light adjusting portion is disposed, the resin layer further including a light refractive pattern protruding toward a rear direction of the display panel; and an adhesive layer having a second refractive index different from the first refractive index, and bonding the resin layer with the second polarizing plate.

20 Claims, 9 Drawing Sheets

(58) Field of Classification Search
USPC .......................................................... 349/112
See application file for complete search history.

(56) References Cited

U.S. PATENT DOCUMENTS

| | | |
|---|---|---|
| 2013/0265774 A1 | 10/2013 | Umeda et al. |
| 2014/0353645 A1 | 12/2014 | Jeong et al. |
| 2015/0285963 A1* | 10/2015 | Asaoka ................ G02B 5/0268 349/112 |
| 2015/0378069 A1* | 12/2015 | Yamamoto .............. B32B 27/08 359/361 |
| 2017/0115524 A1* | 4/2017 | Ochi ................. G02F 1/133526 |
| 2018/0196172 A1 | 7/2018 | Shim et al. |
| 2019/0122597 A1* | 4/2019 | Lee ................... G02F 1/133504 |

FOREIGN PATENT DOCUMENTS

| | | |
|---|---|---|
| KR | 10-2009-0110655 | 10/2009 |
| KR | 10-1802628 | 11/2017 |

OTHER PUBLICATIONS

Extended Search Report and Written Opinion dated Feb. 4, 2020 in counterpart European Patent Application No. 19202504.7.

\* cited by examiner

DISPLAY APPARATUS

CROSS-REFERENCE TO RELATED APPLICATION

This application is based on and claims priority under 35 U.S.C. § 119 to Korean Patent Application No. 10-2018-0127427, filed on Oct. 24, 2018 in the Korean Intellectual Property Office, the disclosure of which is incorporated by reference herein in its entirety.

BACKGROUND

1. Field

The disclosure relates to a display apparatus, and for example, to a display apparatus with an improved viewing angle.

2. Description of Related Art

A display apparatus is a kind of output apparatus that visually displays images and data information, such as characters, figures, etc.

The display apparatus includes a self-emissive display panel such as Organic Light Emitting Diodes (OLEDs) or a non-emissive display panel such as a Liquid Crystal Display (LCD).

A display apparatus to which a non-emissive display panel is applied includes a backlight unit for supplying light to the display panel.

The display apparatus to which the non-emissive display panel is applied has difficulties in implementing a perfect black screen because side light partially leaks out of the light source module of the backlight module that is always in a turned-on state.

SUMMARY

An embodiment of the disclosure provides a display apparatus with an improved structure to improve color reproduction.

It is another example aspect of the disclosure to provide a display apparatus capable of improving a light amount difference according to a viewing angle.

Additional aspects of the disclosure will be set forth in part in the description which follows and, in part, will be apparent from the description.

In accordance with an example aspect of the disclosure, a display apparatus is provided, the display apparatus including a display panel configured to receive light from a light source module, wherein the display panel includes: a liquid crystal panel; a first polarizing plate positioned on a rear side of the liquid crystal panel and a second polarizing plate positioned on a front side of the liquid crystal panel; and an optical layer positioned on a front surface of the second polarizing plate, wherein the optical layer includes: a resin layer having a first refractive index, the resin layer including an accommodating groove in which a light adjusting portion is disposed, and a light refractive pattern protruding toward a rear direction of the display panel; and an adhesive layer having a second refractive index different from the first refractive index, and bonding the resin layer with the second polarizing plate.

The resin layer may be a single layer.

The light adjusting portion may include a light refracting portion having a third refractive index and configured to refract a part of light inclined with respect to a reference line extending in a normal direction of the light refractive pattern of light entering the light refractive pattern, wherein the light refracting portion may be disposed in at least one area of the accommodating groove.

The first refractive index of the resin layer may be different by 0.1 or more from the second refractive index of the adhesive layer and the third refractive index of the light refracting portion.

The light adjusting portion may further include a light absorbing portion configured to absorb the other part of the light inclined with respect to the reference line extending in the normal direction of the light refractive pattern of the light entering the light refractive pattern, and the light refracting portion and the light absorbing portion may be disposed in the accommodating groove, wherein the light refracting portion may be positioned on a front side of the light absorbing portion.

The light absorbing portion may include at least one of a black resin, a carbon black, a mixture of metal particles, graphite powder, gravure ink, black spray, or black enamel.

The resin layer may include a first optical surface opposite the adhesive layer and the accommodating groove and the light refractive pattern.

The accommodating groove and the light refractive pattern may be arranged alternately along a left-right direction of the display panel.

The accommodating groove may include a first accommodating groove and a second accommodating groove neighboring the first accommodating groove, wherein the light refractive pattern is positioned between the first accommodating groove and the second accommodating groove and may include a first vertex disposed at an edge of the first accommodating groove and in contact with the adhesive layer, a second vertex disposed at an edge of the second accommodating groove and in contact with the adhesive layer, and a third vertex located between the first vertex and the second vertex and located behind the first vertex and the second vertex.

The light refractive pattern may include a cross section having a shape of a triangle.

A line passing one of the first vertex and the second vertex and the third vertex may form an angle of 10 degrees to 40 degrees with respect to an angle reference line passing one of the first vertex and the second vertex and extending in a left-right direction of the display panel.

The resin layer may further include a second optical surface facing a front direction of the display panel and being an opposite surface of the first optical surface, and the display panel may further include a protective film disposed on the second optical surface of the resin layer.

In accordance with another example aspect of the disclosure, a display apparatus is provided, the display apparatus including a display panel configured to receive light from a light source module, wherein the display panel includes: a liquid crystal panel; a first polarizing plate positioned on a rear side of the liquid crystal panel and a second polarizing plate positioned on a front side of the liquid crystal panel; and an optical layer positioned on a front surface of the second polarizing plate, wherein the optical layer includes a resin layer having a first refractive index, the resin layer including an accommodating groove in which a light adjusting portion is disposed, and the light adjusting portion includes a light refracting portion having a second refractive index different from the first refractive index and configured to refract a part of light entering the optical layer, the light refracting portion disposed in at least one area of the accommodating groove.

A difference between the first refractive index of the resin layer and the second refractive index of the light refracting portion may be 0.1 or more.

The light adjusting portion may further include a light absorbing portion configured to absorb the other part of the light entering the optical layer, and the light refracting portion and the light absorbing portion may be disposed in the accommodating groove, wherein the light refracting portion may be positioned on a front side of the light absorbing portion.

The light absorbing portion may include at least one of a black resin, a carbon black, a mixture of metal particles, graphite powder, gravure ink, black spray, or black enamel.

The optical layer may further include an adhesive layer having a third refractive index different from the first refractive index and bonding the resin layer with the second polarizing plate.

The resin layer may further include a light refractive pattern protruding toward a rear direction of the display panel and in contact with the adhesive layer.

The light refractive pattern may include a cross section in the shape of a triangle.

In accordance with another example aspect of the disclosure, a display apparatus is provided, the display apparatus including a display panel configured to receive light from a light source module, wherein the display panel includes: a liquid crystal panel; a first polarizing plate positioned on a rear side of the liquid crystal panel and a second polarizing plate positioned on a front side of the liquid crystal panel; and an optical layer positioned on a front surface of the second polarizing plate, wherein the optical layer includes: a resin layer, the resin layer comprising a single layer having a first refractive index, and including a plurality of accommodating grooves each accommodating groove having a light adjusting portion and a light refractive pattern positioned between the plurality of accommodating grooves neighboring each other and protruding toward a rear direction of the display panel, wherein the light adjusting portion includes: a light refracting portion having a second refractive index and configured to refract a part of light entering the optical layer; and a light absorbing portion configured to absorb the other part of the light entering the optical layer, wherein the light absorbing portion and the light refracting portion are both disposed in each of the accommodating grooves.

BRIEF DESCRIPTION OF THE DRAWINGS

These above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the disclosure will be described in greater detail with reference to the accompanying drawings. In the following description, the terms "front end", "rear end", "upper portion", "lower portion", "upper end", and "lower end" are defined based on the drawings, and the shapes and positions of the corresponding components are not limited by the terms. Further, the term "on" as used herein is not limited to directly contacting and covers both directly on and indirectly on.

Figure 1:
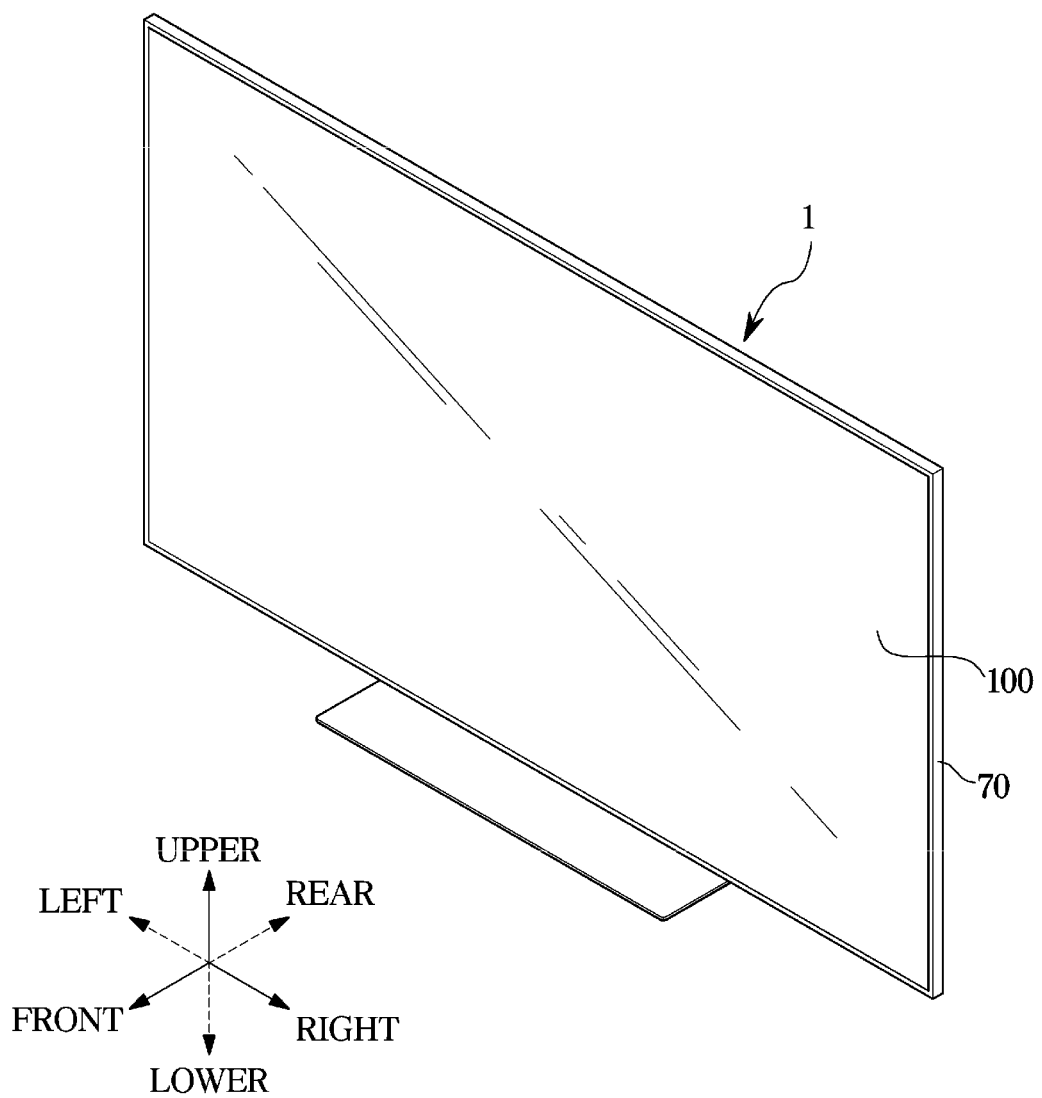
FIG. 1 is a perspective view illustrating an example display apparatus according to an embodiment of the disclosure.
Figure 2:
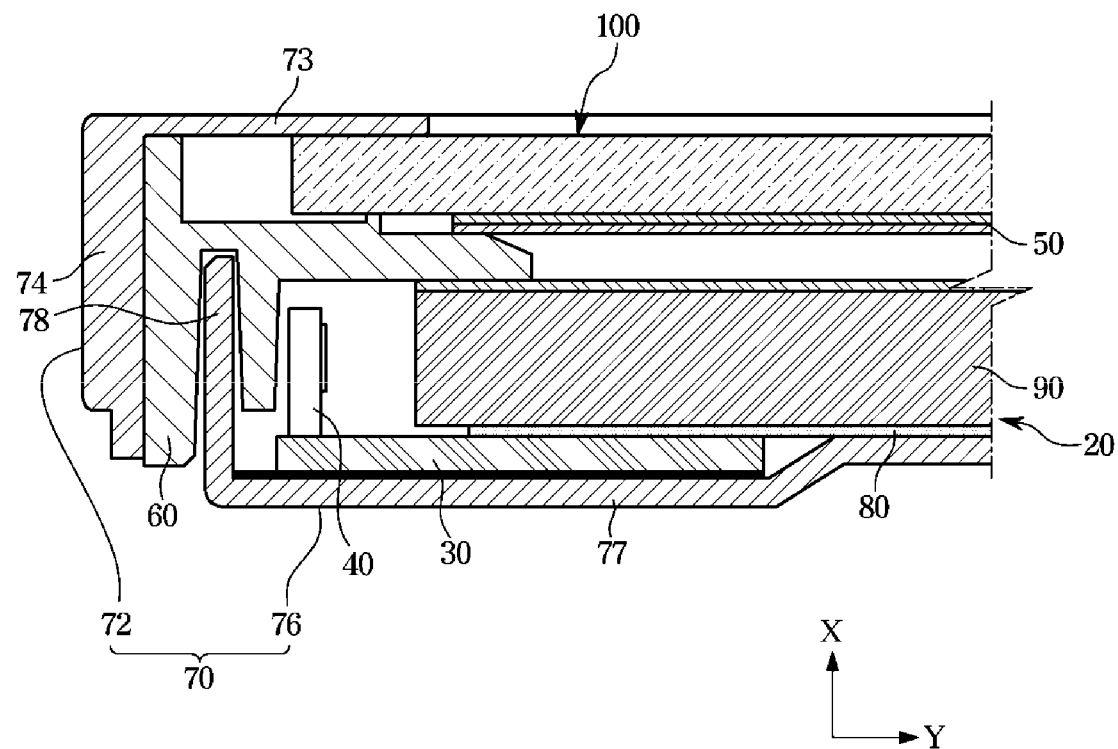
FIG. 2 is a cross-sectional view illustrating an example display apparatus according to an embodiment of the disclosure.

FIG. 1 is a perspective view illustrating an example display apparatus according to an embodiment of the disclosure, and FIG. 2 is a cross-sectional view illustrating an example display apparatus according to an embodiment of the disclosure.

A display apparatus 1 may include a display module for displaying images.

The display module may include a display panel 100 on which images are displayed and a backlight unit (BLU) 20 configured to supply light to the display panel 100.

The backlight unit 20 may include a printed circuit board 30, a light source module (e.g., including light emitting circuitry or a backlight) 40, a light guide plate 90, and an optical sheet 50. The light source module 40 may be positioned behind the display panel 100. The light guide plate 90 may function to transfer light emitted from the light source module 40 to the display panel 100. The light guide plate 90 may be positioned behind the display panel 100 to face the light source module 40. The optical sheet 50 may be positioned between the display panel 100 and the light guide plate 90 to change optical properties of light emitted from the light source module 40.

The display apparatus 1 may further include a middle mold 60 supporting the display panel 100 and a display chassis 70 forming an outer appearance of the display apparatus 1. The display chassis 70 may include a top chassis 72 coupled with a front portion of the middle mold 60 to maintain a state in which the display panel 100 is installed in the middle mold 60, and a bottom chassis 76 coupled with a rear portion of the middle mold 60, wherein the light source module 40 may be installed in the bottom chassis 76.

The light source module 40 may be positioned in a front portion of the bottom chassis 76 to irradiate light toward the display panel 100. The light source module 40 may include a point light source (e.g., a light emitting diode) for emitting monochromatic light or white light.

In the front portion of the middle mold 60, the display panel 100 and the top chassis 72 may be positioned in this order, and in the rear portion of the middle mold 60, the bottom chassis 76 may be positioned. The middle mold 60 may support the display panel 100, the top chassis 72, and the bottom chassis 76, and maintain the display panel 100 and the bottom chassis 76 in a separated state.

The top chassis 72 may include a bezel portion 73 covering a front edge of the display panel 100 and a top side portion 74 bent backward from an edge of the bezel portion 73 to cover a side surface of the middle mold 60.

The bottom chassis 76 may include a rear portion 77 forming a rear surface of the display module, and a bottom side portion 78 extending in a front direction from a circumference of the rear portion 77 and inserted into the middle mold 60. The bottom chassis 76 may, for example, be in the shape of a polygonal plate of a high strength, and include a metal material (for example, aluminum or an aluminum alloy) with low thermal deformation by heat generated by heat generation from at least one of the light source module 40 and the display panel 100. The bottom chassis 76 may be molded with a plastic material (for example, poly carbonate (PC)) or by adding a glass fiber to a plastic material.

The printed circuit board 30 may be positioned on the bottom chassis 76. A plurality of light source modules 40 may be mounted on the printed circuit board 30. A size of the printed circuit board 30 may correspond to that of the display panel 100. The plurality of light source modules 40 may be arranged in a plurality of rows on the printed circuit board 30. The plurality of light source modules 40 may be arranged in a surface type on the printed circuit board 30. The light source modules 40 will be described later.

The backlight unit 20 may further include a reflective sheet 80. The reflective sheet 80 may re-reflect light reflected by the optical sheet 50, the display panel 100, etc. among light emitted from the light source module 40 toward the display panel 100. The reflective sheet 80 may be positioned on a front surface of the printed circuit board 30 and reflect leaking light toward the display panel 100, thereby improving light efficiency. The reflective sheet 80 may be positioned between the light guide plate 90 and the bottom chassis 76. The reflective sheet 80 may be coated with a high-reflectance coating agent (for example, silver or TiO$_2$) of a white or silver color. The reflective sheet 80 may include a reflective plate.

The optical sheet 50 may cause light irradiated from the light source module 40 toward the display panel 100 to have uniform or substantially uniform luminance. Light of uniform luminance passed through the optical sheet 50 may be incident to the display panel 100. The optical sheet 50 may include, for example, and without limitation, at least one of a protective sheet, a prism sheet, a diffuser sheet, or the like. The backlight unit 20 may include at least one piece or more of the optical sheet 50.

The display apparatus 1 has been described as a flat panel display apparatus, however, the disclosure is not limited thereto and the display apparatus 1 may be one of various forms of display apparatuses, such as a curved display apparatus having a curved screen or a curvature variable display apparatus capable of changing a curvature of a screen.

The display apparatus 1 has been described as an edge type display apparatus, however, the disclosure is not limited thereto and the display apparatus 1 may be a direct type display apparatus.

Figure 3:
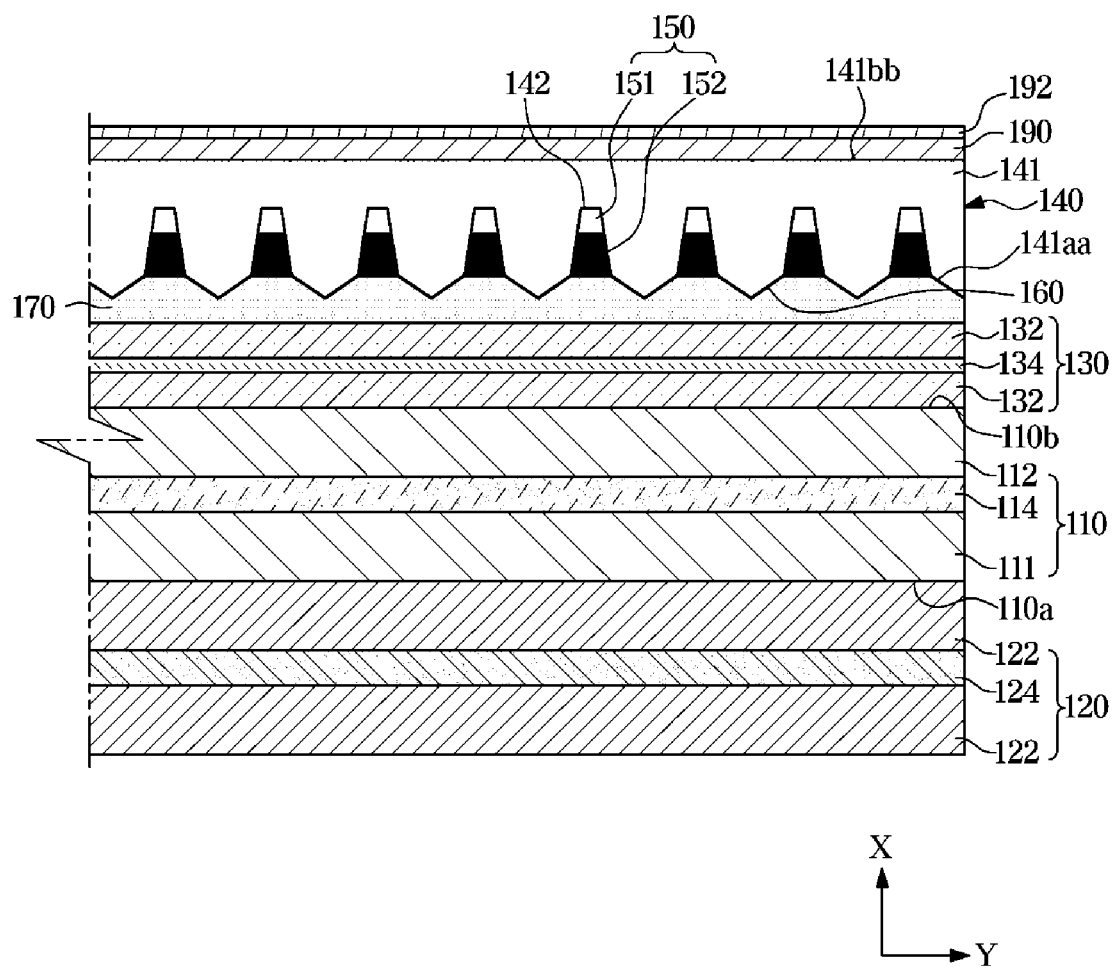
FIG. 3 is a cross-sectional view illustrating an example display panel in a display apparatus according to an embodiment of the disclosure.
Figure 4:
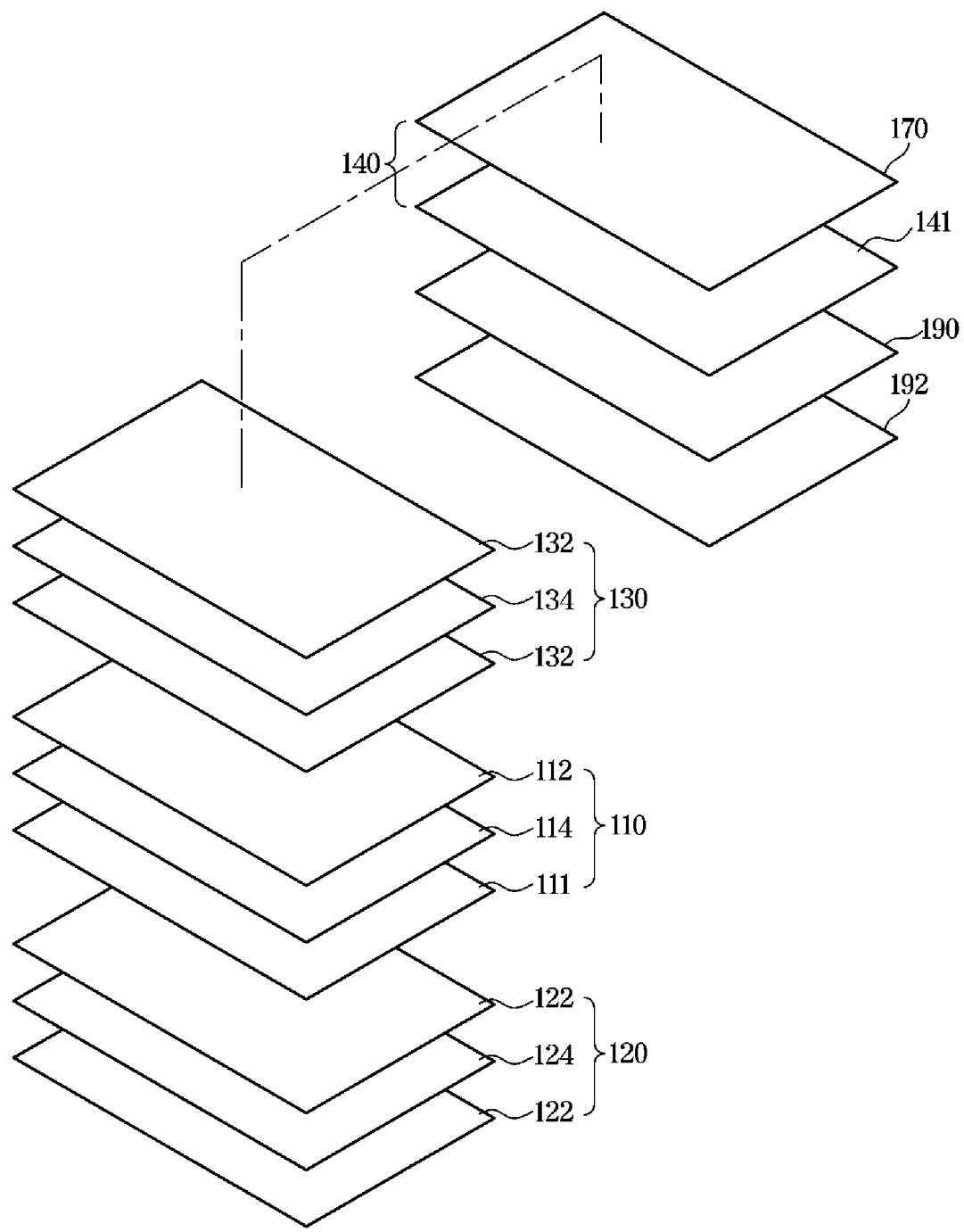
FIG. 4 is an exploded perspective view illustrating an example display panel in a display apparatus according to an embodiment of the disclosure.
Figure 5:
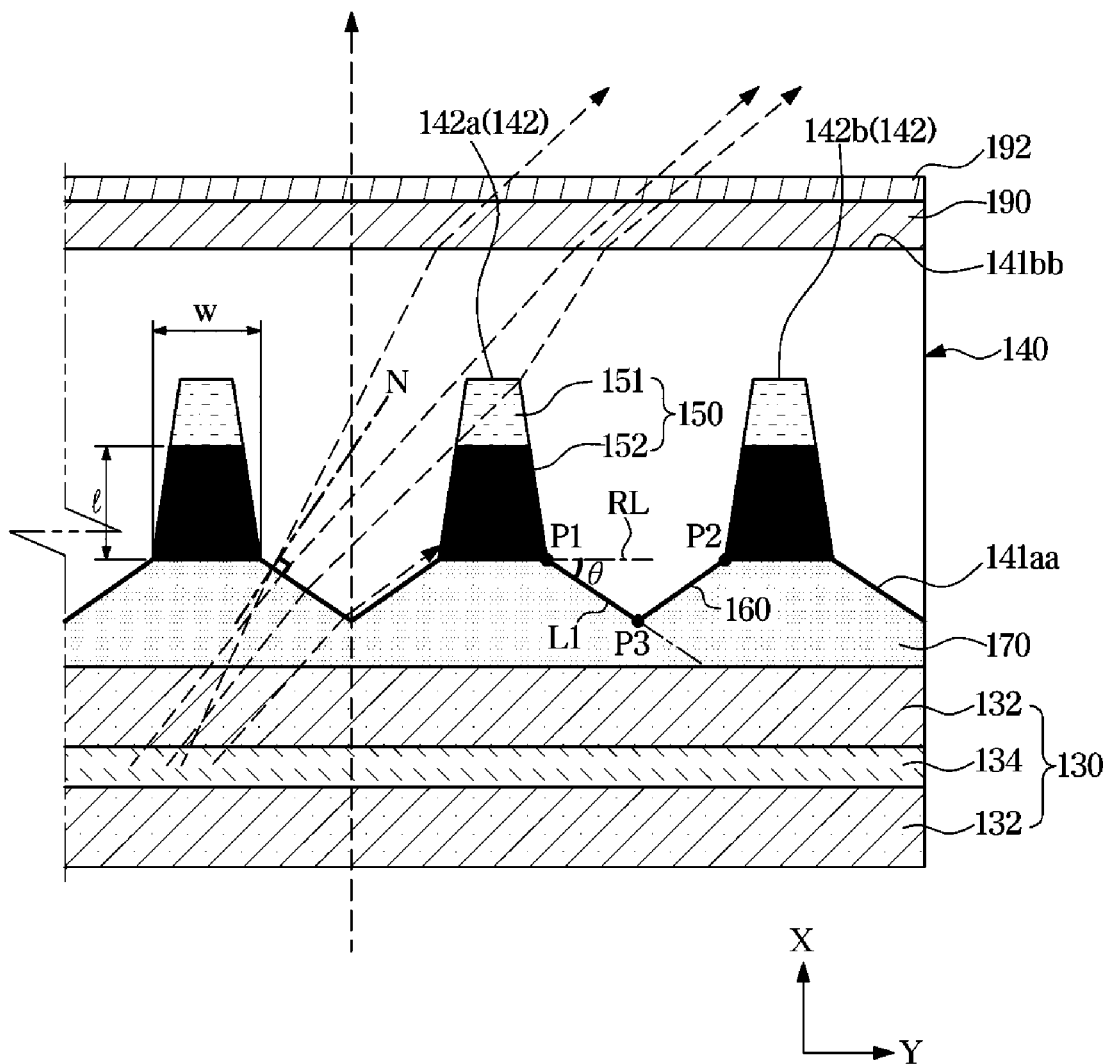
FIG. 5 is a diagram illustrating an example traveling path of light passing through some components of a display panel in a display apparatus according to an embodiment of the disclosure.

FIG. 3 is a cross-sectional view illustrating an example display panel in a display apparatus according to an embodiment of the disclosure, FIG. 4 is an exploded perspective view illustrating an example display panel in a display apparatus according to an embodiment of the disclosure, and FIG. 5 is a diagram illustrating an example traveling path of light passing through some components of a display panel in a display apparatus according to an embodiment of the disclosure.

As shown in FIGS. 3, 4 and 5, the display panel 100 may convert an electrical signal into an optical signal to display an image. The display panel 100 may include a liquid crystal panel 110 and a plurality of polarizing plates 120 and 130 (also, referred to herein as a first polarizing plate 120 and a second polarizing plate 130).

The liquid crystal panel 110 may be positioned on a front side of the backlight unit 20 to block or transmit light emitted from the backlight unit 20.

A front surface of the liquid crystal panel 110 may form a screen of the display apparatus 1. The liquid crystal panel 110 may be configured with a plurality of pixels. The plurality of pixels included in the liquid crystal panel 110 may block or transmit light emitted from the backlight unit 20 independently. Light transmitted by the plurality of pixels may form an image that is displayed on the display apparatus 1.

The liquid crystal panel 110 may include a first transparent substrate 111, a second transparent substrate 112, and a liquid crystal layer 114. The liquid crystal panel 110 may further include pixel electrodes, thin-film transistors, common electrodes, and color filters (not shown). The first transparent substrate 111 and the second transparent substrate 112 may form an outer appearance of the liquid crystal panel 110, and protect the liquid crystal layer 114, the color filters, etc. positioned between the first transparent substrate 111 and the second transparent substrate 112. The first transparent substrate 111 and the second transparent substrate 112 may be made of tempered glass or a transparent resin.

Liquid crystal may refer, for example, to an intermediate state between a solid (crystal) state and a liquid state. When a material in a solid state is heated, the material changes from the solid state to a transparent liquid state at its melting temperature. However, when a liquid crystal material in a solid state is heated, the liquid crystal material changes to an opaque, turbid liquid at its melting temperature, and then changes to a transparent liquid state. Most of liquid crystal materials are organic compounds. A molecule of a liquid crystal material is in the shape of a thin, long rod. The molecular arrangement of the liquid crystal material is irregular when seen in a specific direction, but appears as a regular crystalloid pattern when seen in another direction. Accordingly, the liquid crystal has both the fluidity of a liquid and the optical anisotropy of a crystal (solid).

Liquid crystal may show an optical property according to a change in electric field. For example, the direction of the molecular arrangement of liquid crystal may change according to a change in electric field.

When an electric field is formed in the liquid crystal layer 114, liquid crystal molecules of the liquid crystal layer 114 may be arranged according to the direction of the electric field, and when no electric field is formed in the liquid crystal layer 114, the liquid crystal molecules may be arranged irregularly or according to an alignment layer (not shown).

As a result, the optical property of the liquid crystal layer 114 may change according to the presence/absence of an electric field passing through the liquid crystal layer 114. For example, when no electric field is formed in the liquid crystal layer 114, light polarized by the first polarizing plate 120 may pass through the liquid crystal layer 114 and then pass through the second polarizing plate 130 due to the arrangement of the liquid crystal molecules of the liquid crystal layer 114. Meanwhile, when an electric field is formed in the liquid crystal layer 114, the arrangement of the liquid crystal molecules of the liquid crystal layer 114 may change so that light polarized by the first polarizing plate 120 may not pass through the second polarizing plate 130.

On the first and second transparent substrates 111 and 112, the plurality of polarizing plates 120 and 130 may be disposed.

The polarizing plates 120 and 130 may include the first polarizing plate 120 positioned on a rear surface of the first transparent substrate 111, and the second polarizing plate 130 positioned on a front surface of the second transparent substrate 112.

The first polarizing plate 120 may be positioned on a first surface 110a of the liquid crystal panel 110. For example, the first polarizing plate 120 may be in contact with the first surface 110a of the liquid crystal panel 110. The first polarizing plate 120 may include a first protective film 122 and a first polarizing film 124. The first protective film 122 may be formed of a material having durability and a non-optical property. The first protective film 122 may include, for example, and without limitation, at least one of a tri-acetyl cellulose (TAC) film, polyethylene terephthalate (PET), or acryl.

The first polarizing film 124 may be in contact with the first protective film 122. In the current embodiment, the first polarizing film 124 may be disposed between a pair of first protective films 122. The first polarizing film 124 may include polyvinyl alcohol (PVA). The first polarizing film 124 may include a dichromatic material that polarizes light in a specific direction in PVA.

The second polarizing plate 130 may be positioned on a second surface 110b of the liquid crystal panel 110. That is, the second polarizing plate 130 may be in contact with the second surface 110b of the liquid crystal panel 110. The second surface 110b may correspond to the first surface 110a. For example, the first surface 110a of the liquid crystal panel 110 may face the rear direction of the display panel 100, and the second surface 110b of the liquid crystal panel 110 may face the front direction of the display panel 100. The second polarizing plate 130 may include a second protective film 132 and a second polarizing film 134. A pair of second protective films 132 may be provided to protect front and rear surfaces of the second polarizing film 134. The second protective film 132 may be made of a material having durability and a non-optical property. The second protective film 132 may include, for example, and without limitation, at least one of a TAC film, PET, or acryl.

The second polarizing film 134 may be in contact with the second protective film 132. In the current embodiment, the second polarizing film 134 may be positioned between the pair of second protective films 132. The second polarizing film 134 may include PVA. The second polarizing film 134 may include a dichromatic material that polarizes light in a specific direction in PVA.

Light may be configured with a pair of an electric field and a magnetic field vibrating in a direction that is orthogonal to the traveling direction of the light. Also, the electric field and the magnetic field may vibrate in all directions that are orthogonal to the traveling direction of the light. A phenomenon in which the electric field or the magnetic field vibrates in a specific direction is called polarization, and a film of transmitting light including an electric field or a magnetic field vibrating in a predetermined direction and blocking light including an electric field and a magnetic field vibrating in the other directions except for the predetermined direction is called a polarizing film. In other words, a polarizing film may transmit light vibrating in a predetermined direction, and block light vibrating in the other directions.

The first polarizing film 124 may transmit light having an electric field and a magnetic field vibrating in a first direction, and block the other light. The second polarizing film 134 may transmit light having an electric field and a magnetic field vibrating in a second direction, and block the other light. The first direction may be orthogonal to the second direction. In other words, a vibrating direction of light transmitted by the first polarizing film 124 may be orthogonal to a vibrating direction of light transmitted by the second polarizing film 134. As a result, light may not be transmitted at the same time through both the first polarizing film 124 and the second polarizing film 134.

The display panel 100 may further include an optical layer 140 positioned on a front surface of the second polarizing plate 130. Light passing the liquid crystal panel 110 and the plurality of polarizing plates 120 and 130 may be incident to the optical layer 140. Light emitted from the light source module 40 may pass the first polarizing plate 120, the liquid crystal panel 110, and the second polarizing plate 130 sequentially. Light transmitted through the second polarizing plate 130 may be incident to the optical layer 140.

Light supplied from the light source module 40 may be diffused by differences in refractive index between internal components of the display panel 100. Due to this phenomenon, at regions being at a predetermined angle with respect to the front direction of the display apparatus 1, desired colors may be not represented due to light leaking out of the display panel 100. The optical layer 140 may absorb such light emitted unnecessarily or reflect the light in the front direction to improve picture quality of the display apparatus 1. To compensate for a light emission amount that may be reduced due to the partial absorption of light, the optical layer 140 may diffuse light.

The optical layer 140 may include a resin layer 141. The resin layer 141 may be a single layer. The resin layer 141 may include a transparent resin allowing light transmission. The resin layer 141 may, for example, have a width corresponding to that of the second polarizing plate 130. The resin layer 141 may have a first refractive index n1.

The resin layer 141 may include a first optical surface 141aa facing the rear direction of the display panel 100 and a second optical surface 141bb facing the front direction of the display panel 100, the second optical surface 141bb being an opposite surface of the first optical surface 141aa. The first optical surface 141aa of the resin layer 141 may be opposite to an adhesive layer 170. In other words, the first optical surface 141aa may be adjacent to the adhesive layer 170.

The resin layer 141 may further include an accommodating groove 142 in which a light adjusting portion 150 is accommodated. The resin layer 141 may include a plurality of accommodating grooves 142. The accommodating groove 142 may be formed concavely in the first optical surface 141aa of the resin layer 141 such that the light adjusting portion 150 is disposed in or on the accommodating groove. A cross section of the accommodating groove 142 may be in the shape of a trapezoid. However, the cross section of the accommodating groove 142 is not limited to a trapezoid shape. For example, the cross section of the accommodating groove 142 may, for example, and without limitation, be in the shape of a triangle, a rectangle, a part of a circle, a semicircle, an oval, or the like, or a combination thereof.

The light adjusting portion 150 may include a light refracting portion 151 for refracting a part of light emitted from the light sources and entering the optical layer 140. In other words, the light adjusting portion 150 may include the light refracting portion 151 for refracting a part of light inclined with respect to a reference line N extending in a normal direction of a light refractive pattern 160 among light emitted from the light source module 40 and entering the light refractive pattern 160. The light refracting portion 151 may have a second refractive index n2 that is different from the first refractive index n1 of the resin layer 141. A difference between the first refractive index n1 of the resin layer 141 and the second refractive index n2 of the light refracting portion 151 may, for example, be 0.1 or more. For example, the resin layer 141 may have a higher refractive index than the light refracting portion 151, and the light refracting portion 151 may have a lower refractive index than the resin layer 141. The light refracting portion 151 may be disposed in the accommodating groove 142. For example, the light refracting portion 151 may be disposed in at least one area of the accommodating groove 142. For example, the light refracting portion 151 may be disposed in an area of the accommodating groove 142.

The light adjusting portion 150 may further include a light absorbing portion 152 for absorbing the other part of light emitted from the light source module 40 and entering the optical layer 140. In other words, the light adjusting portion 150 may further include the light absorbing portion 152 for absorbing the other part of light inclined with respect to the reference line N extending in the normal direction of the light refractive pattern 160 among light emitted from the light source module 40 and entered the light refractive pattern 160. The light absorbing portion 152 may be filled in the accommodating groove 142. For example, the light refracting portion 151 and the light absorbing portion 152 may be disposed in the accommodating groove 142, wherein the light refracting portion 151 is located on a front side of the light absorbing portion 152.

A length l in front-rear direction of the cross section of the light absorbing portion 152 may be longer than a width w in left-right direction of the cross section of the light absorbing portion 152. Therefore, the light absorbing portion 152 may efficiently absorb light that may leak out at regions spaced at the predetermined angle or higher with respect to the front direction of the display panel 100 among light entering the optical layer 140. Because the light absorbing portion 152 absorbs light that may leak out at regions spaced at the predetermined angle or higher with respect to the front direction of the display panel 100 among light emitted from the light source module 40 and entering the optical layer 140, a black mode may be implemented with improved light leakage. The black mode may refer, for example, to a mode for displaying a screen of the display apparatus 1 as black.

The light absorbing portion 152 may include, for example, and without limitation, at least one of a black resin, a carbon black, a mixture of metal particles, graphite powder, gravure ink, black spray, black enamel, or the like.

The plurality of accommodating grooves 142 may be formed with a predetermined height in a front-rear direction X of the display panel 100 in the first optical surface 141aa of the resin layer 141, and the plurality of accommodating grooves 142 may be arranged in a left-right direction Y of the display panel 100. The plurality of accommodating grooves 142 may be arranged in the first optical surface 141aa of the resin layer 141 in such a way to be spaced at regular intervals.

The light refracting portion 151 and the light absorbing portion 152 may be disposed in each of the plurality of accommodating grooves 142. For example, the light refracting portion 151 and the light absorbing portion 152 may be disposed in each of the plurality of accommodating grooves 142, wherein the light refracting portion 151 is located on a front side of the light absorbing portion 152. By designing the display panel 100 such that parts of light inclined with respect to the reference line N extending in the normal direction of the light refractive pattern 160 are refracted by the light refracting portion 151 disposed in the plurality of accommodating grooves 142 arranged in the first optical surface 141aa of the resin layer 141 to be spaced at regular intervals, a normal mode having a wide viewing angle may be implemented. The normal mode may refer, for example, to a mode for displaying colors of a screen of the display apparatus 1 with light supplied from the light source module 40. By designing the display panel 100 such that parts of light inclined with respect to the reference line N extending in the normal direction of the light refractive pattern 160 are absorbed by the light absorbing portion 152 disposed in the plurality of accommodating grooves 142 arranged in the first optical surface 141aa of the resin layer 141 to be spaced at regular intervals, light leakage may be effectively prevented and/or reduced.

The resin layer 141 may further include the light refractive pattern 160 protruding toward the rear direction of the display panel 10. The light refractive pattern 160 may be formed in the first optical surface 141aa of the resin layer 141 to protrude toward the rear direction of the display panel 100. The resin layer 141 may include a plurality of light refractive patterns 160.

The accommodating grooves 142 and the light refractive patterns 160 may be arranged alternately along the left-right direction Y of the display panel 100.

For example, the accommodating grooves 142 may include a first accommodating groove 142a and a second accommodating groove 142b neighboring the first accommodating groove 142a. The light refractive pattern 160 may be positioned between the first accommodating groove 142a and the second accommodating groove 142b. The light refractive pattern 160 may include a first vertex P1 formed at an edge of the first accommodating groove 142a being in contact with the adhesive layer 170, a second vertex P2 formed at an edge of the second accommodating groove 142b being in contact with the adhesive layer 170, and a third vertex P3 located between the first vertex P1 and the second vertex P2 and located behind the first vertex P1 and the second vertex P2.

A line L1 passing any one of the first vertex P1 and the second vertex P2 and the third vertex P3 may form an angle θ of, for example, 10 degrees to 40 degrees with respect to an angle reference line RL passing any one of the first vertex P1 and the second vertex P2 and extending in the left-right direction Y of the display panel 100. The line L1 passing any one of the first vertex P1 and the second vertex P2 and the third vertex P3 may form an angle of 20 degrees to 30 degrees with respect to the angle reference line RL passing any one of the first vertex P1 and the second vertex P2 and extending in the left-right direction Y of the display panel 100. When the light refractive pattern 160 has an angle of 10 degrees to 40 degrees, it may be less difficult to dispose the light adjusting portion 150 in the accommodating groove 142. For example, it may be less difficult to adjust an amount of the light refracting portion 151 or the light absorbing portion 152 and thus fill the accommodating groove 142 by a desired amount. The adhesive layer 170 may be adhered more uniformly on the resin layer 141. Thereby, mura may be prevented and/or reduced from being generated on a screen of the display apparatus 1. The mura may include, for example, printing stain.

The light refractive pattern 160 may, for example, include a polygonal cross section. The light refractive pattern 160 may, for example, include a cross section of a triangle. The light refractive pattern 160 may include a cross section of a triangle having the first vertex P1, the second vertex P2, and the third vertex P3. The light refractive pattern 160 may include a cross section of an isosceles triangle. When the light refractive pattern 160 has a cross section of an isosceles triangle, an angle of a line passing the first vertex P1 and the third vertex P3 with respect to the angle reference line RL may be equal to an angle of a line passing the second vertex P2 and the third vertex P3 with respect to the angle reference line RL.

The light refractive pattern 160 may diffuse light emitted from the light source module 40 together with the light refracting portion 151 to widen a viewing angle.

The optical layer 140 may further include the adhesive layer 170 for bonding the resin layer 141 on the second polarizing plate 130. The adhesive layer 170 may be positioned on the rear side of the resin layer 141. The adhesive layer 170 may have a third refractive index n3 that is different from the first refractive index n1 of the resin layer 141. A difference between the first refractive index n1 of the resin layer 141 and the third refractive index n3 of the adhesive layer 170 may, for example, and without limitation, be 0.1 or more. For example, the resin layer 141 may have a higher refractive index than the adhesive layer 170, and the adhesive layer 170 may have a lower refractive index than the adhesive layer 141. The second refractive index n2 of the light refracting portion 151 may be equal to or different from the third refractive index n3 of the adhesive layer 170 as long as the second refractive index n2 of the light refracting portion 151 and the third refractive index n3 of the adhesive layer 170 are smaller than the first refractive index n1 of the resin layer 141.

The display panel 100 may further include a protective film 190 disposed on an outer surface of the optical layer 140. For example, the protective film 190 may be positioned on the second optical surface 141bb of the resin layer 141. The protective film 190 may include, for example, and without limitation, a TAC film, PET, or acryl.

The display panel 100 may further include a surface layer 192 formed on an outer surface of the protective film 190.

Hereinafter, a method of manufacturing the optical layer 140 will be briefly described.

The accommodating grooves 142 and the light refractive patterns 160 may be formed in the first optical surface 141aa of the resin layer 141, and the light refracting portion 151 and the light absorbing portion 152 may be disposed sequentially in each of the accommodating grooves 142. Thereafter, the adhesive layer 141 may be adhered on the first optical surface 141aa of the resin layer 141 such that a part of the light absorbing portion 152 and the light refractive pattern 160 are in contact with the adhesive layer 170. After the first optical surface 141aa of the resin layer 141 is bonded on one surface of the adhesive layer 170, a release paper (not shown) of the adhesive layer 170 may be removed and the second polarizing plate 130 may be bonded on the other surface of the adhesive layer 170. The method of manufacturing the optical layer 140 is not limited to the above-described example, and may be modified variously.

A traveling path of light emitted from the light source module 40 and entering the optical layer 140 will be described in greater detail below.

Light parallel to the reference line N extending in the normal direction of the light refractive pattern 160 among light emitted from the light source module 40 and entered the light refractive pattern 160 may be emitted as it is toward the front direction of the display panel 100.

Light inclined with respect to the reference line N extending in the normal direction of the light refractive pattern 160 among light emitted from the light source module 40 and entered the light refractive pattern 160 may be primarily refracted by the light refractive pattern 160. A part of the light refracted by the light refractive pattern 160 may be absorbed by the light absorbing portion 152. Light not absorbed by the light absorbing portion 152 among the light refracted by the light refracting portion 160 may be emitted to a region spaced at a predetermined angle with respect to the front direction of the display panel 100, or may be secondarily refracted by the light refracting portion 151 and then emitted to the region spaced at the predetermined angle with respect to the front direction of the display panel 100. As such, by applying the optical layer 140 having the light refractive pattern 160 and the light refracting portion 151, an effect of widening a viewing angle in the normal mode may be expected. In addition, by applying the optical layer 140 having the light absorbing portion 152, light leakage in the black mode may be effectively reduced.

Figure 6:
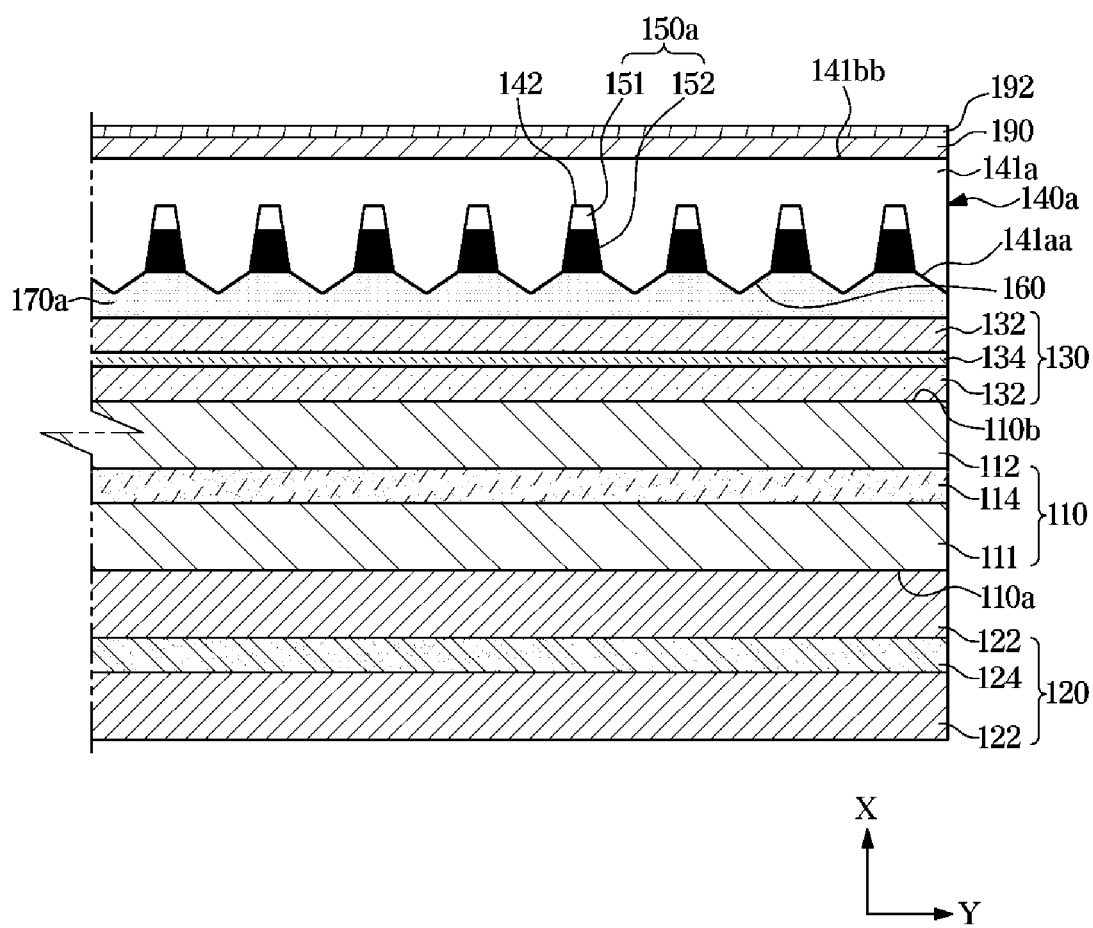
FIG. 6 is a cross-sectional view of an example display panel in a display apparatus according to an embodiment of the disclosure.
Figure 7:
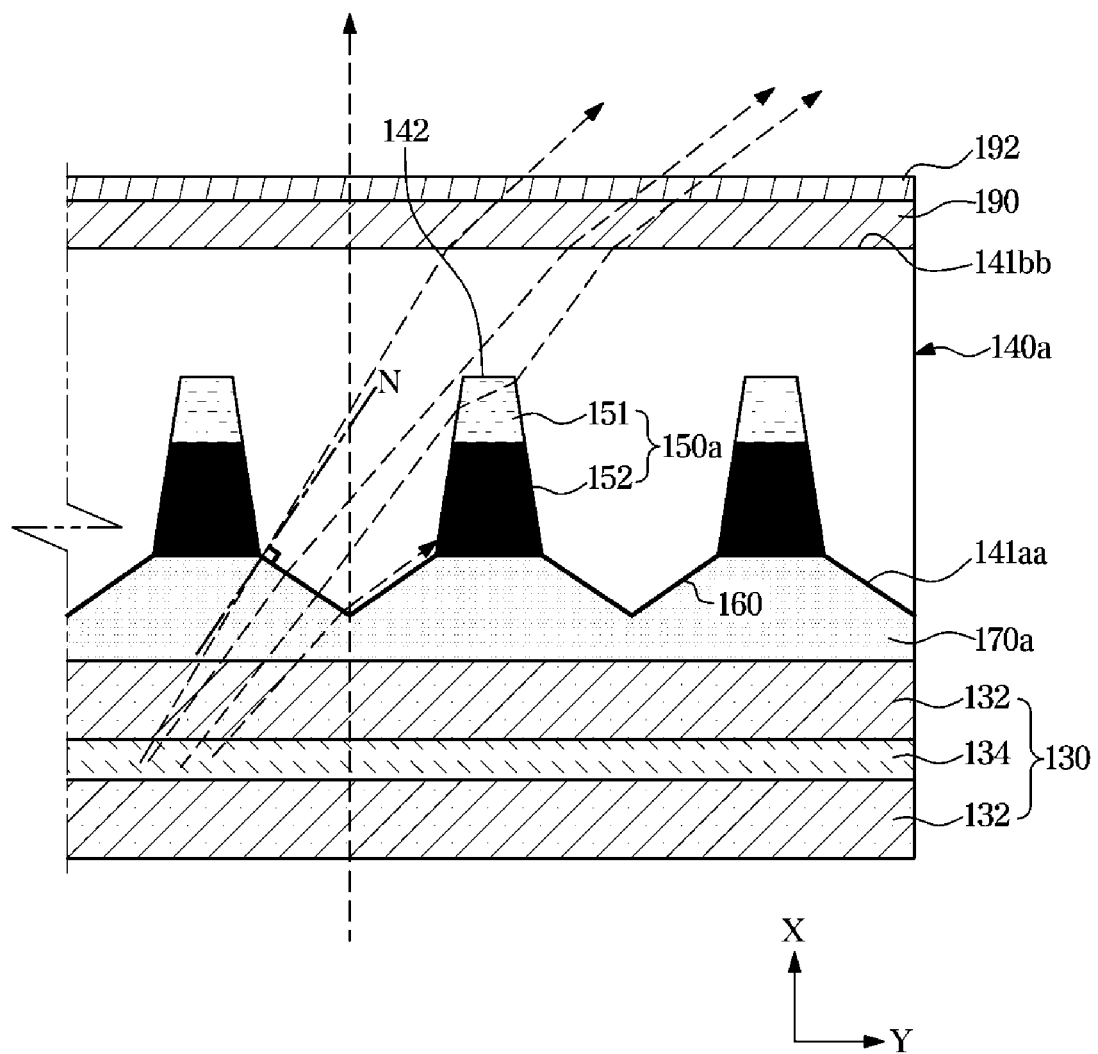
FIG. 7 is a diagram illustrating an example traveling path of light passing through some components of a display panel in a display apparatus according to an embodiment of the disclosure.

FIG. 6 is a cross-sectional view illustrating an example display panel in a display apparatus according to an embodiment of the disclosure, and FIG. 7 is a diagram illustrating an example traveling path of light passing through some components of a display panel in a display apparatus according to an embodiment of the disclosure. Hereinafter, descriptions overlapping with those given above with reference to FIGS. 1 to 5 may not be repeated. In FIGS. 6 and 7, a reference numeral "140a" indicates an optical layer, and a reference numeral "150a" indicates an optical adjusting portion.

As illustrated in FIGS. 6 and 7, a resin layer 141a may have a first refractive index n1 and the light refracting portion 151 may have a second refractive index n2 that is different from the first refractive index n1 of the resin layer 141a. A difference between the first refractive index n1 of the resin layer 141a and the second refractive index n2 of the light refracting portion 151 may, for example, and without limitation, be 0.1 or more. For example, the resin layer 141a may have a lower refractive index than the light refracting portion 151, and the light refracting portion 151 may have a higher refractive index than the rein layer 141a. The light refracting portion 151 may be disposed in the accommodating groove 142. For example, the light refracting portion 151 and the light absorbing portion 152 may be disposed in the accommodating groove 142, wherein the light refracting portion 151 may be located on a front side of the light absorbing portion 152.

Figure 8:
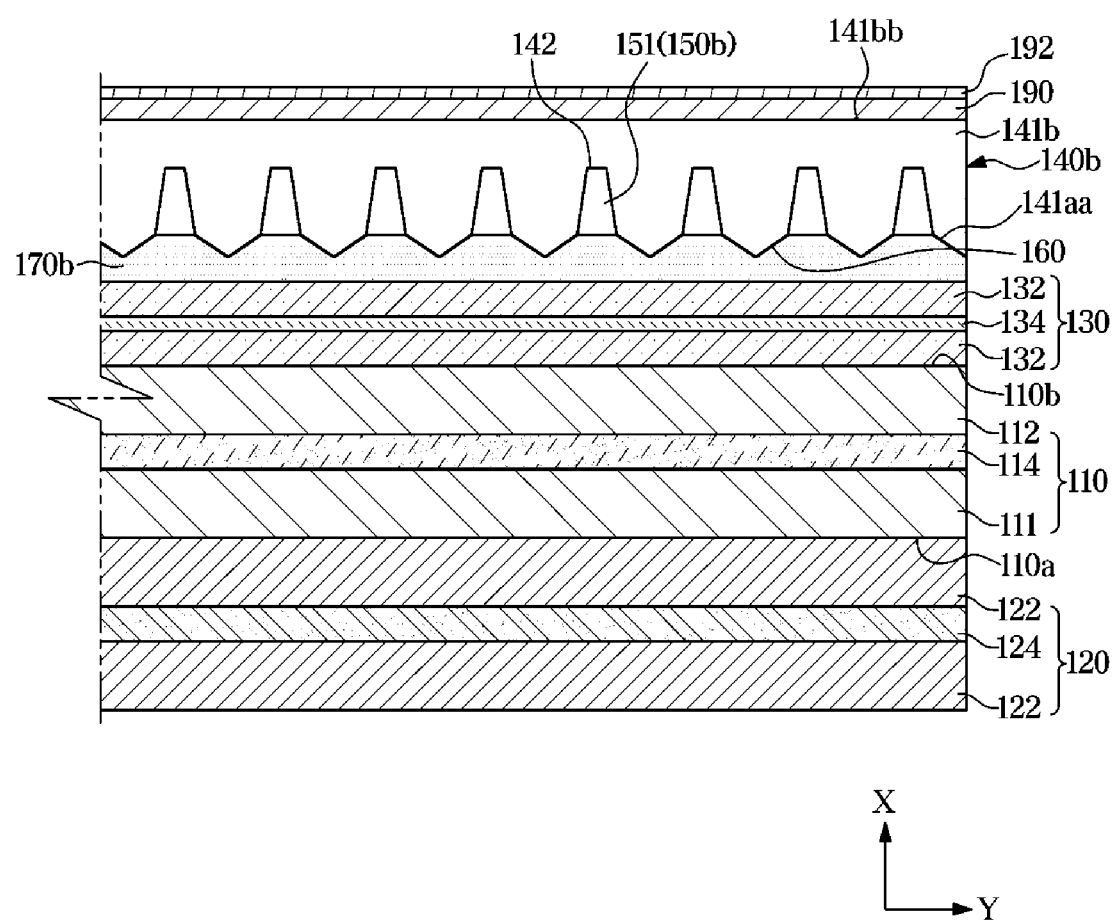
FIG. 8 is a cross-sectional view of an example display panel in a display apparatus according to an embodiment of the disclosure.
Figure 9:
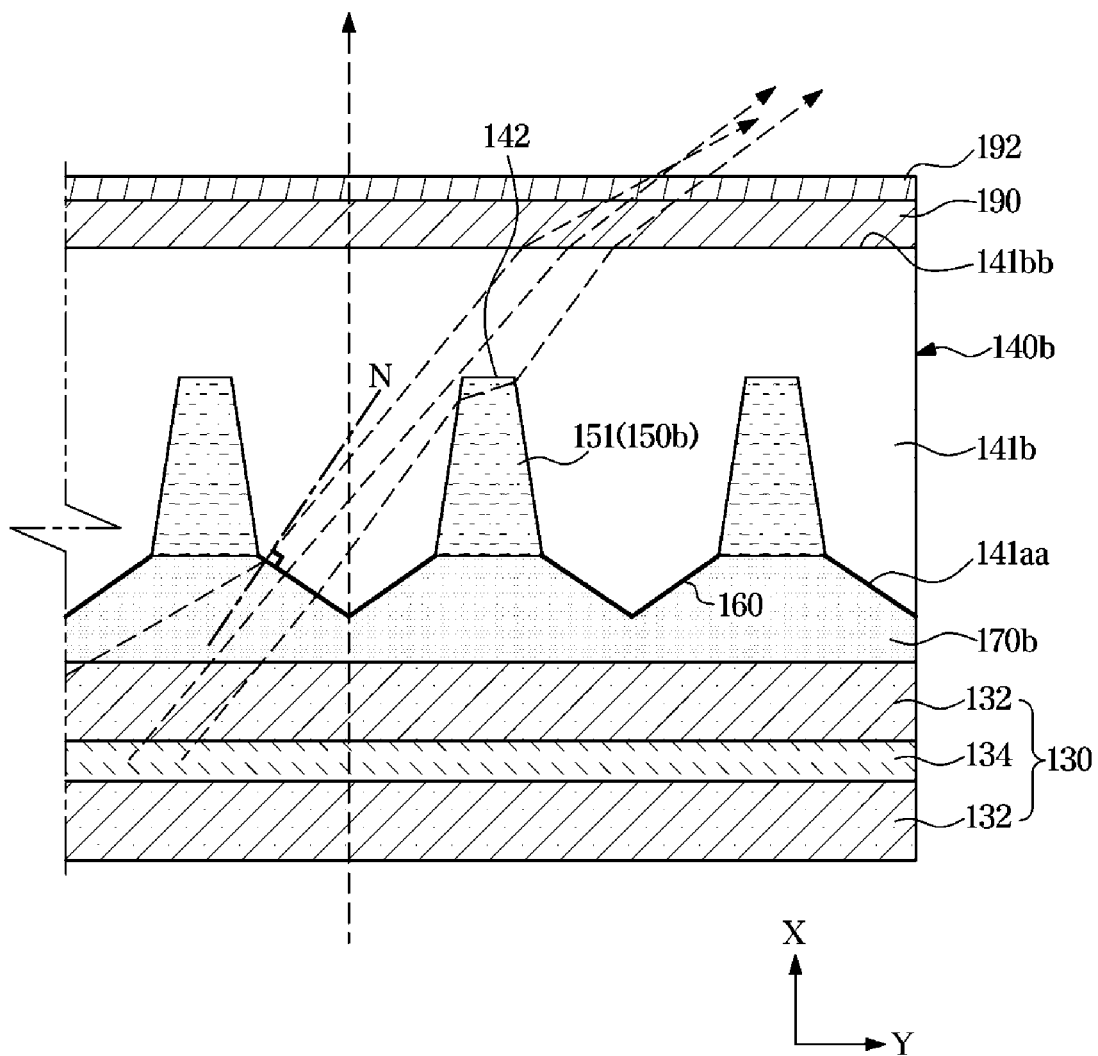
FIG. 9 is a diagram illustrating an example traveling path of light passing through some components of a display panel in a display apparatus according to an embodiment of the disclosure.

A difference between the first refractive index n1 of the resin layer 141a and a third refractive index n3 of an adhesive layer 170a may, for example, and without limitation, be 0.1 or more. For example, the resin layer 141a may have a lower refractive index than the adhesive layer 170a, and the adhesive layer 170a may have a higher refractive index than the rein layer 141a. The second refractive index n2 of the light refracting portion 151 may be equal to or different from the third refractive index n3 of the adhesive layer 170a as long as the second refractive index n2 of the light refracting portion 151 and the third refractive index n3 of the adhesive layer 170a are greater than the first refractive index n1 of the resin layer 141. FIG. 8 is a cross-sectional view illustrating an example display panel in a display apparatus according to an embodiment of the disclosure, and FIG. 9 is a diagram illustrating an example traveling path of light passing through some components of a display panel in a display apparatus according to an embodiment of the disclosure. Hereinafter, descriptions overlapping with those given above with reference to FIGS. 1 to 5 may not be repeated.

As illustrated in FIGS. 8 and 9, a light adjusting portion 150b may be configured with the light refracting portion 151. That is, the light refracting portion 151 may be disposed in the accommodating grooves 142.

A resin layer 141b may have a first refractive index n1, and the light refracting portion 151 may have a second refractive index n2 that is different from the first refractive index n1 of the resin layer 141b. A difference between the first refractive index n1 of the resin layer 141b and the second refractive index n2 of the light refracting portion 151 may, for example, and without limitation, be 0.1 or more. For example, the resin layer 141b may have a lower refractive index than the light refracting portion 151, and the light refracting portion 151 may have a higher refractive index than the resin layer 141b. The light refracting portion 151 may be filled in the accommodating grooves 142. For example, the light refracting portion 151 may be disposed in substantially the entire spaces of the accommodating grooves 142.

An adhesive layer 170b may have a third refractive index n3 that is different from the second refractive index n2 of the light refracting portion 151. A difference between the third refractive index n3 of the adhesive layer 170b and the second refractive index n2 of the light refracting portion 151 may be 0.1 or more. For example, the adhesive layer 170b may have a lower refractive index than the light refracting portion 151, and the light refracting portion 151 may have a higher refractive index than the adhesive layer 170b. The first refractive index n1 of the resin layer 141b may be equal to or different from the third refractive index n3 of the adhesive layer 170b as long as the first refractive index n1 of the resin layer 141b and the third refractive index n3 of the adhesive layer 170a are smaller than the second refractive index n2 of the light refracting portion 151. The second refractive index n2 of the light refracting portion 151 may be smaller than the first refractive index n1 of the resin layer 141b and the third refractive index n3 of the adhesive layer 170b.

A traveling path of light emitted from the light source module 40 and entering the optical layer 140b will be described below.

Light parallel to the reference line N extending in the normal direction of the light refractive pattern 160 among light emitted from the light source module 40 and entered the light refractive pattern 160 may be emitted as it is toward the front direction of the display panel 100.

Light inclined with respect to the reference line N extending in the normal direction of the light refractive pattern 160 among light emitted from the light source module 40 and entered the light refractive pattern 160 may be primarily refracted by the light refractive pattern 160.

A part of the light refracted by the light refractive pattern 160 may be emitted to a region spaced at a predetermined angle with respect to the front direction of the display panel 100, or may be secondarily refracted by the light refracting portion 151 and then emitted to the region spaced at the predetermined angle with respect to the front direction of the display panel 100. As such, by applying the optical layer 140b having the light refractive pattern 160 and the light refracting portion 151, an effect of widening a viewing angle in the normal mode may be expected.

By applying the optical layer having at least one of the light refractive pattern or the light refracting portion to the display panel, color reproduction and a light amount difference according to a viewing angle may be improved and also an effect of widening a viewing angle may be expected.

By applying the optical layer having the light absorbing portion to the display panel, a perfect black mode may be realized.

While various example embodiments of the disclosure have been illustrated and described, it will be appreciated by those skilled in the art that various changes in form and detail may be made in these embodiments without departing from the principles and spirit of the disclosure, the scope of which may be defined, for example, in the claims and their equivalents.

What is claimed is:

1. A display apparatus including a display panel configured to receive light from a light source module, wherein the display panel comprises:
 a liquid crystal panel;
 a first polarizing plate positioned on a rear side of the liquid crystal panel and a second polarizing plate positioned on a front side of the liquid crystal panel; and
 an optical layer positioned on a front surface of the second polarizing plate,
 wherein the optical layer comprises:
 a resin layer having a first refractive index, the resin layer including an accommodating groove defined therein in which a light adjusting portion is disposed, wherein the groove becomes smaller moving toward the front side of the display panel, wherein the resin layer further including a light refractive pattern having an uneven surface comprising respective peaks protruding toward a rear direction of the display panel; and
 an adhesive layer having a second refractive index different from the first refractive index, and bonding the resin layer with the second polarizing plate, wherein the adhesive layer has an uneven surface comprising valleys that are aligned with the peaks of the light refractive pattern.

2. The display apparatus according to claim 1, wherein the resin layer is a single layer.

3. The display apparatus according to claim 1, wherein the light adjusting portion comprises a light refracting portion having a third refractive index and configured to refract a part of light inclined with respect to a reference line extending in a normal direction of the light refractive pattern of light entering the light refractive pattern,
 wherein the light refracting portion is disposed in at least one area of the accommodating groove.

4. The display apparatus according to claim 3, wherein the first refractive index of the resin layer is different by 0.1 or more from the second refractive index of the adhesive layer and the third refractive index of the light refracting portion.

5. The display apparatus according to claim 3, wherein the light adjusting portion further comprises a light absorbing portion configured to absorb the other part of the light inclined with respect to the reference line extending in the normal direction of the light refractive pattern of the light entering the light refractive pattern, and the light refracting portion and the light absorbing portion are disposed in the accommodating groove, wherein the light refracting portion is positioned on a front side of the light absorbing portion.

6. The display apparatus according to claim 5, wherein the light absorbing portion includes at least one of a black resin, a carbon black, a mixture of metal particles, graphite powder, gravure ink, black spray, or black enamel.

7. The display apparatus according to claim 1, wherein the resin layer comprises a first optical surface opposite the adhesive layer and in which the accommodating groove and the light refractive pattern are provided.

8. The display apparatus according to claim 7, wherein the accommodating groove and the light refractive pattern are arranged alternately along a left-right direction of the display panel.

9. The display apparatus according to claim 7, wherein the resin layer further includes a second optical surface facing a front direction of the display panel and being an opposite surface of the first optical surface, and
the display panel further includes a protective film positioned on the second optical surface of the resin layer.

10. The display apparatus according to claim 1, wherein the accommodating groove includes a first accommodating groove and a second accommodating groove neighboring the first accommodating groove, and
the light refractive pattern positioned between the first accommodating groove and the second accommodating groove includes a first vertex located at an edge of the first accommodating groove being in contact with the adhesive layer, a second vertex located at an edge of the second accommodating groove being in contact with the adhesive layer, and a third vertex at one of the peaks located between the first vertex and the second vertex and located behind the first vertex and the second vertex.

11. The display apparatus according to claim 10, wherein the light refractive pattern includes a cross section having a shape of a triangle.

12. The display apparatus according to claim 10, wherein a line passing one of the first vertex and the second vertex and the third vertex forms an angle of 10 degrees to 40 degrees with respect to an angle reference line passing one of the first vertex and the second vertex and extending in a left-right direction of the display panel.

13. A display apparatus including a display panel configured to receive light from a light source module, wherein the display panel comprises:
a liquid crystal panel;
a first polarizing plate positioned on a rear side of the liquid crystal panel and a second polarizing plate positioned on a front side of the liquid crystal panel; and
an optical layer positioned on a front surface of the second polarizing plate,
wherein the optical layer comprises a resin layer having a first refractive index, the resin layer including an accommodating groove in which a light adjusting portion is disposed, wherein the groove becomes smaller moving toward the front side of the display panel, wherein the resin layer further includes a light refractive pattern having an uneven surface comprising respective peaks protruding toward a rear direction of the display panel, and
the light adjusting portion comprises a light refracting portion having a second refractive index different from the first refractive index and configured to refract a part of light entering the optical layer, the light refracting portion being disposed in at least one area of the accommodating groove.

14. The display apparatus according to claim 13, wherein a difference between the first refractive index of the resin layer and the second refractive index of the light refracting portion is 0.1 or more.

15. The display apparatus according to claim 13, wherein the light adjusting portion further comprises a light absorbing portion configured to absorb the other part of the light entering the optical layer, and
the light refracting portion and the light absorbing portion are disposed in the accommodating groove, wherein the light refracting portion is positioned on a front side of the light absorbing portion so that the light refracting portion in the groove is located closer to the front side of the display panel than is the light absorbing portion which is also located in the groove.

16. The display apparatus according to claim 15, wherein the light absorbing portion includes at least one of a black resin, a carbon black, a mixture of metal particles, graphite powder, gravure ink, black spray, or black enamel.

17. The display apparatus according to claim 13, wherein the optical layer further comprises an adhesive layer having a third refractive index different from the first refractive index and bonding the resin layer with the second polarizing plate.

18. The display apparatus according to claim 17, wherein the resin layer further comprises a light refractive pattern protruding toward a rear direction of the display panel and in contact with the adhesive layer.

19. The display apparatus according to claim 18, wherein the light refractive pattern includes a cross section having a shape of a triangle.

20. A display apparatus including a display panel configured to receive light from a light source module, wherein the display panel comprises:
a liquid crystal panel;
a first polarizing plate positioned on a rear side of the liquid crystal panel and a second polarizing plate positioned on a front side of the liquid crystal panel; and
an optical layer positioned on a front surface of the second polarizing plate,
wherein the optical layer comprises:
a resin layer comprising a single layer having a first refractive index, and including a plurality of accommodating grooves each accommodating groove having a light adjusting portion and a light refractive pattern positioned between the plurality of accommodating grooves neighboring each other and protruding toward a rear direction of the display panel, wherein the grooves becomes smaller moving toward the front side of the display panel,
wherein the light adjusting portion, located in each of the grooves, comprises:
a light refracting portion having a second refractive index and configured to refract a part of light entering the optical layer; and
a light absorbing portion configured to absorb the other part of the light entering the optical layer and disposed in each of the plurality of accommodating grooves together with the light refracting portion so that the light refracting portion in a given one of the grooves is located closer to the front side of the display panel than is the light absorbing portion which is also located in the given groove.

* * * * *